Patented Apr. 27, 1948

2,440,421

UNITED STATES PATENT OFFICE 2,440,421

METALLATION OF CYANO ACETIC ACID COMPOUNDS

Vernon H. Wallingford, Ferguson, and August H. Homeyer, Webster Groves, Mo., assignors to Mallinckrodt Chemical Works, St. Louis, Mo., a corporation of Missouri No Drawing. Application October 29, 1945, Serial No. 625,450

9 Claims. (Cl. 260—464)

This invention relates to the metallation of organic compounds, and with regard to certain more specific features to the replacement of active carbon-bonded hydrogen atoms of α-cyano esters with metals of the class of the alkali metals and magnesium.

Among the several objects of the invention may be noted the provision of a general process for bringing about a metallation of the type indicated which is characterized in its high yields, its inexpensive and readily procurable reaction materials, and the facility with which it may be carried out. Other objects will be in part obvious and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

Metal organic compounds of the alkali metals and magnesium are exceedingly useful intermediates for the preparation of a wide variety of organic compounds. Many processes have been devised for the preparation of such compounds, but these prior processes have usually offered one or another disadvantage, such as low yields, expensive or unavailable reaction materials, difficult reaction conditions, and the like. The present invention provides a metallation process which, so far as we can determine, is free of all such disadvantages and which consequently is a highly advantageous procedure to use to achieve the desired results.

It is difficult to define with accuracy the broad class of materials to which the process of the present invention applies. In general, it appears that the process can be satisfactorily used in all instances where metallation of the type indicated is wanted. Most of such instances seem to comprehend the replacement of an active carbon-bonded hydrogen on the organic compound with the metal, and the invention will be so described, although it is not intended thereby to so limit the scope of the invention.

From the practical standpoint, metallation of the type herein concerned is usually the formation of the sodium (sodio-) compound. But it will likewise be clearly understood that metallation with the other alkali metals, that is, with lithium, potassium, rubidium, cesium or with magnesium, is not only feasible but also expeditious according to the present invention.

Broadly speaking the process of the present invention comprises treating α-cyano esters to be metallated with a metal alcoholate, preferably alcohol-free, in a reaction medium comprising a dialkyl carbonate. This may be represented by the following equation:

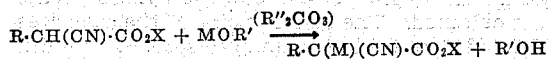

$$R \cdot CH(CN) \cdot CO_2X + MOR' \xrightarrow{(R''_2CO_3)} R \cdot C(M)(CN) \cdot CO_2X + R'OH$$

where R is hydrogen or an aromatic or saturated aliphatic hydrocarbon radical, M is lithium, sodium, potassium, rubidium, cesium or magnesium. R' is the radical of the alcoholate, and R'' and X are alkyls.

Whether or not the dialkyl carbonate actually enters into the reaction has not yet been definitely established. Its presence appears to be an important factor.

The reaction may be forced to substantial completion by heating, as it progresses, to distill off the product alcohol (R'OH in the above equation). In case the original metal alcoholate contains alcohol, such alcohol is likewise removed by this distillation procedure. This procedure, while somewhat optional, is highly advantageous in its improvement of the yield of metallo-compound obtained.

The following examples illustrate the present invention. They are exemplary, only.

EXAMPLE 1

*Ethyl α-cyano-p-methylphenylacetate*

Sodium ethylate, substantially free of alcohol, was prepared by dissolving sodium metal (3.74 g.) in anhydrous ethyl alcohol (75 ml.) in a three-nicked flask fitted with a reflux condenser. When the sodium had dissolved the condenser was arranged for distillation and the excess alcohol was distilled off and the residue was heated at reduced pressure until the sodium ethylate was substantially free of alcohol. After cooling the solid cake of sodium ethylate was broken up. Diethyl carbonate (100 ml.) and ethyl α-cyano-p-methylphenylacetate (33 g.) were added and the resulting mixture stirred until all of the sodium ethylate dissolved. After connecting the reaction flask to a small packed column, the metallation reaction was brought to completion by heating the reactants at 90–100° C. until no more alcohol was obtained as distillate at the head of the column under 150 mm. pressure.

The presence of a high yield of metallated ethyl α-cyano-p-methylphenylacetate was shown by alkylating with an excess of ethyl bromide. A good yield of ethyl α-cyano-α-ethyl-p-methylphenylacetate, having a boiling point of 104–108°

C. at about 2.5 mm. and a refractive index of about $n_D^{27.3}$ 1.4985 was obtained.

EXAMPLE 2 n-Propyl α-cyanoisocaproate

Sodium propylate, substantially free of alcohol, was prepared by the method described in Example 1 for the preparation of sodium ethylate, by dissolving sodium (5.0 g.) in anhydrous n-propyl alcohol (100 ml.) and then removing the excess alcohol under vacuum. Di-n-propyl carbonate (80 ml.) and n-propyl α-cyanoisocaproate (39.5 g.) were added and the resulting mixture stirred until all of the sodium propylate was dissolved. After connecting the small reaction flask to a small column, the metallation reaction was brought to completion by heating the reactants at 90–100° C. until nor more n-propyl alcohol was obtained as distillate at the head of the column under 150 mm. pressure.

The presence of a high yield of metallated n-propyl α-cyanoisocaproate was shown by alkylating with an excess of ethyl bromide. A high yield of n-propyl α-cyano-α-ethylisocaproate was obtained. The boiling point of the ester was 65.5–69° C. at 0.4 to 0.9 mm. pressure. The index of refraction of the ester was about $n_D^{26}$ 1.4299.

Carrying out the above metallation procedures without the simultaneous removal, by distillation, of the alcohol produced in the reaction, is entirely feasible, but the yield is decreased from that otherwise obtainable.

Attention is directed to our copending Patent 2,391,530, which is a continuation-in-part of and was copending with our Patent 2,351,085.

In view of the above, it will be seen that the several objects of the invention are achieved and other advantageous results attained.

As many changes could be made in the above processes without departing from the scope of the invention, it is intended that all matter contained in the above description shall be interpreted as illustrative and not in a limiting sense.

We claim:

1. The method of metallating an α-cyano ester of the following structure:

$$R \cdot CH(CN) \cdot CO_2X$$

where R is selected from the group consisting of hydrogen, aromatic hydrocarbon radicals, and saturated aliphatic hydrocarbon radicals, and X is an alkyl radical, which comprises reacting the ester with an anhydrous alcoholate of a metal selected from the group consisting of sodium, potassium and magnesium in a reaction medium consisting essentially of a dialkyl carbonate.

2. The method of metallating an α-cyano ester of the following structure:

$$R \cdot CH(CN) \cdot CO_2X$$

where R is selected from the group consisting of hydrogen, aromatic hydrocarbon radicals, and saturated aliphatic hydrocarbon radicals, and X is an alkyl radical, which comprises reacting the ester with an anhydrous alcoholate of a metal selected from the group consisting of sodium, potassium and magnesium in a reaction medium consisting essentially of a dialkyl carbonate, and removing alcohol.

3. The method of metallating an α-cyano ester of the following structure:

$$R \cdot CH(CN) \cdot CO_2X$$

where R is selected from the group consisting of hydrogen, aromatic hydrocarbon radicals, and saturated aliphatic hydrocarbon radicals, and X is an alkyl radical, which comprises reacting the ester with an anhydrous alcoholate of a metal selected from the group consisting of sodium, potassium and magnesium in a reaction medium consisting essentially of a dialkyl carbonate, subjecting the mixture to distillation for removing alcohol therefrom.

4. The method of metallating ethyl α-cyano-p-methylphenylacetate, which comprises reacting the ester with anhydrous sodium ethylate in a reaction medium consisting essentially of diethyl carbonate.

5. The method of metallating n-propyl α-cyanoisocaproate, which comprises reacting the ester with anhydrous sodium propylate in a reaction medium consisting essentially of di-n-propyl carbonate.

6. The method of metallating ethyl α-cyano-p-methylphenylacetate, which comprises mixing and heating the ester with anhydrous alcohol-free sodium ethylate in a reaction medium consisting essentially of diethyl carbonate, and continuously subjecting the mixture to distillation for removing alcohol.

7. The method of metallating n-propyl α-cyano-isocaproate, which comprises mixing and heating the ester with anhydrous alcohol-free sodium propylate in a reaction medium consisting essentially of di-n-propyl carbonate, and continuously subjecting the mixture to distillation for removing alcohol.

8. The method of metallating ethyl α-cyano-p-methylphenylacetate, which comprises reacting the ester with an anhydrous alcoholate of a metal selected from the group consisting of sodium, potassium and magnesium in a reaction medium consisting essentially of a dialkyl carbonate.

9. The method of metallating n-propyl α-cyano-isocaproate, which comprises reacting the ester with an anhydrous alcoholate of a metal selected from the group consisting of sodium, potassium and magnesium in a reaction medium consisting essentially of a dialkyl carbonate.

VERNON H. WALLINGFORD.
AUGUST H. HOMEYER.

REFERENCES CITED

The following references are of record in the file of this patent:

UNITED STATES PATENTS

| Number | Name | Date |
|---|---|---|
| 2,363,003 | Jones | Nov. 21, 1944 |

OTHER REFERENCES

Lux., Ber. der Deut. Chem. Gesell., vol. 62 (1929), pages 1824–1827.

Conrad et al., Annalin der Chem. (Tubig), vol. 204 (1880), pages 121, 129, 130, 131.